United States Patent
Cheung et al.

(10) Patent No.: US 11,687,324 B2
(45) Date of Patent: *Jun. 27, 2023

(54) PROPERTY MANAGEMENT METHOD AND PROPERTY MANAGEMENT SYSTEM AND MACHINE USING THE SAME

(71) Applicant: ABLE WORLD INTERNATIONAL LIMITED, Tortola (VG)

(72) Inventors: Wai-Tung Cheung, Hong Kong (HK); Chun-Hsiao Lin, New Taipei (TW); Ho-Cheung Cheung, Hong Kong (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,171

(22) Filed: Apr. 11, 2022

(65) Prior Publication Data
US 2022/0237717 A1 Jul. 28, 2022

Related U.S. Application Data

(63) Continuation of application No. 15/542,546, filed as application No. PCT/CN2016/070705 on Jan. 12, 2016, now Pat. No. 11,341,589.
(Continued)

(51) Int. Cl.
*G06F 3/01* (2006.01)
*G06F 3/033* (2013.01)
(Continued)

(52) U.S. Cl.
CPC ............... *G06F 8/34* (2013.01); *G06F 8/20* (2013.01); *G06F 8/35* (2013.01); *G06F 8/38* (2013.01);
(Continued)

(58) Field of Classification Search
CPC ..... G06F 8/34; G06F 8/20; G06F 8/35; G06F 8/38; G06F 9/451; G06F 9/5055;
(Continued)

(56) References Cited

U.S. PATENT DOCUMENTS

| 2004/0088647 A1* | 5/2004 | Miller | G06F 40/12 |
| | | | 715/234 |
| 2007/0113066 A1* | 5/2007 | Samba | G06F 8/61 |
| | | | 713/1 |

(Continued)

FOREIGN PATENT DOCUMENTS

CN 101216846 7/2008

OTHER PUBLICATIONS

Murray Woodsaide et al., Performance by Unified Model Analysis (PUMA), Jul. 12-14, 2005, [Retrieved on Feb. 14, 2023]. Retrieved from the internet: <URL: https://dl.acm.org/doi/pdf/10.1145/1071021.1071022> 12 Pages (1-12) (Year: 2005).*

(Continued)

*Primary Examiner* — Anibal Rivera

(57) ABSTRACT

A property management method is provided. Firstly, a projectable space instance for modeling a home system is provided. When the projectable space instance is acquired by a user, a projector parses the projectable space instance. After the projectable space instance is parsed, a projected home system corresponding to the home system is created, so that at least one property is accessible by the user. A property management system and a machine using the property management method are also provided.

21 Claims, 12 Drawing Sheets

Related U.S. Application Data

(60) Provisional application No. 62/102,360, filed on Jan. 12, 2015.

(51) Int. Cl.
| | |
|---|---|
| *G06F 9/445* | (2018.01) |
| *G06F 8/34* | (2018.01) |
| *G06F 8/20* | (2018.01) |
| *G06F 21/31* | (2013.01) |
| *G06F 8/38* | (2018.01) |
| *G06F 40/106* | (2020.01) |
| *G06F 9/451* | (2018.01) |
| *G06Q 50/16* | (2012.01) |
| *H04L 67/02* | (2022.01) |
| *H04N 7/173* | (2011.01) |
| *G06F 8/35* | (2018.01) |
| *H04L 9/40* | (2022.01) |
| *H04L 67/01* | (2022.01) |
| *G06F 9/50* | (2006.01) |
| *G06F 9/54* | (2006.01) |
| *G06Q 10/06* | (2023.01) |
| *G06Q 10/0631* | (2023.01) |
| *H04L 67/10* | (2022.01) |

(52) U.S. Cl.
CPC .............. *G06F 9/445* (2013.01); *G06F 9/451* (2018.02); *G06F 21/31* (2013.01); *G06F 40/106* (2020.01); *G06Q 50/163* (2013.01); *H04L 67/02* (2013.01); *H04N 7/173* (2013.01); *G06F 9/5055* (2013.01); *G06F 9/5061* (2013.01); *G06F 9/54* (2013.01); *G06Q 10/06* (2013.01); *G06Q 10/06316* (2013.01); *H04L 63/102* (2013.01); *H04L 67/01* (2022.05); *H04L 67/10* (2013.01)

(58) Field of Classification Search
CPC .......... G06F 9/5061; G06F 9/54; G06F 21/31; H04L 67/02; H04L 67/01; H04L 67/10
See application file for complete search history.

(56) References Cited

U.S. PATENT DOCUMENTS

| | | | | |
|---|---|---|---|---|
| 2007/0124374 | A1* | 5/2007 | Arun | G06Q 10/10 709/204 |
| 2011/0197147 | A1* | 8/2011 | Fai | G06F 3/0425 715/753 |
| 2012/0151373 | A1* | 6/2012 | Kominac | H04L 67/141 715/740 |

OTHER PUBLICATIONS

International search report issued in International Patent Application No. PCT/CN2016/070705, dated Apr. 1, 2016.

\* cited by examiner

```xml
projectable space instance
               <<XML>>
<?xml version="1.0" encoding="UTF-8" standalone="no"?>
<!DOCTYPE Home System "space.dtd">
<Home System>
  <Cloud Desktop>
    <tool>
      <tool type> ...
      <tool link> ...    } 61
    </tool>
       :
  </Cloud Desktop>
  <Workspace Creator>
    <tool>
      <tool type> ...
      <tool link> ...    } 62
    </tool>
       :
  </Workspace Creator>
  <Service Manager>
    <tool>
      <tool type> ...
      <tool link> ...    } 63
    </tool>
       :
  </Service Manager>
  <Relationship Manager>
    <tool>
      <tool type> ...
      <tool link> ...    } 64
    </tool>
       :
  </Relationship Manager>
</Home System>
```

PROPERTY MANAGEMENT METHOD AND PROPERTY MANAGEMENT SYSTEM AND MACHINE USING THE SAME

CROSS-REFERENCE TO RELATED APPLICATIONS

This application is a continuation application of U.S. patent application Ser. No. 15/542,546, now U.S. Pat. No. 11,341,589, filed on Jul. 10, 2017, which is a national stage entry of PCT patent application PCT/CN2016/070705 filed on Jan. 12, 2016, which claims the benefit of U.S. provisional application No. 62/102,360 filed on Jan. 12, 2015. The contents of each of the aforementioned applications are hereby incorporated by reference in their entireties.

TECHNICAL FIELD

The present invention relates to a property management method and a property management system and a machine using the method, and more particularly to a property management method on internet and a property management system and a machine using the method.

BACKGROUND

In today's convenience daily life, people are accustomed to using an electronic device with computational capability to achieve various kinds of applications. For example, these applications include working, file processing, entertainment, social communication, and so on. With development of science and technology, information can be propagated more quickly. Accordingly, various web platforms, operating systems and software tools have been have been developed for people to use, and brought more efficient lives to the users. Especially in the post-PC era, the conventional desktop computers, tablet computers, mobile phones or other mobile devices still make people to implement tasks whenever and wherever they are, and people over the world communicate with each other to transmit and share information through Internet. However, when the internet is used, some inconvenient and perplexing problems below occur.

Firstly, a large number of information tools in the same or different information formats are distributed in different information sources. It is difficult to integrate the information contents and the tools that are obtained in a single workspace and have different formats because the information contents and the tools in different formats are usually incompatible.

Secondly, since different users have different habits and different purposes of manipulating the electronic devices, the working environments and/or workspaces suitable for the users are only created in their widely-used electronic devices (such as home desktop computers). Once a user leaves a location of the widely-used electronic device, the user can only access information that is stored in the widely-used electronic device through another electronic device via internet. Since the working environment and/or the workspace of another electronic device are not frequently operated by the user, the second electronic device does not provide the widely-used application tool or the specified function. Unless the required application tool or the specified function is reinstalled in another electronic device, the user cannot perform a task.

Thirdly, various kinds of webpage platforms, operating systems and software are almost developed by different developers, and usually independent from and incompatible with each other. Consequently, while a task is performed, it is unable to operate specified functions of different webpage platforms, operating systems and software through a single user interface.

Fourthly, the existing hardware components or software components are developed in view of "personal devices". That is, a large number of data stations with obvious barriers in the internet become obstruction for many people to implement a cooperative task.

Nowadays, no cooperative working environments have been provided for allowing any information, any tool or any service to be arbitrarily combined together by any cooperator according to the practical operational demand. Moreover, no suitable working environments have been provided for allowing every user to manage the workspaces that are created by different promoters and manage the personal property.

Therefore, the existing applications of the internet need to be further improved.

SUMMARY

The present invention provides a property management method and a property management system and a machine using the method in order to improve the application modes of the internet.

In accordance with an aspect of the present invention, there is provided a property management method. Firstly, a projectable space instance for modeling a home system is provided. When the projectable space instance is acquired by a machine, a projector parses the projectable space instance. After the projectable space instance is parsed, a projected home system corresponding to the home system is created, so that at least one property is accessible by a user.

In an embodiment, the projectable space instance is acquired by the machine through a uniform resource identifier (URI) and/or a login process of the user.

In an embodiment, the projectable space instance contains plural unified matters for modeling the home system.

In an embodiment, at least a portion of the plural unified matters constitutes a cloud desktop, a workspace creator, a service manager and/or a relationship manager.

In an embodiment, the user accesses the at least one property through the cloud desktop.

In an embodiment, a deliverable workspace is created by the user through the workspace creator.

In an embodiment, the service manager includes at least one Matterizer, wherein at least one unified tool and/or at least one unified information unit is imported into the home system and/or the at least one property through the at least one Matterizer.

In an embodiment, at least one original tool corresponding to the at least one unified tool includes a utility, a widget, an agent, an application, a service or any executable element accessible from a corresponding machine or a server; and/or at least one original information corresponding to the at least one unified information unit includes a file, a web page, a database row, a policy, a rule, a policy or any information accessible from a corresponding machine or a server.

In an embodiment, an interpersonal relationship is managed, aggregated or accessed by the user through the relationship manager.

In an embodiment, the at least one property includes a deliverable workspace that is modelled by an additional projectable space instance, and at least one unified matter is allowed to be added to or removed from the additional projectable space instance.

In an embodiment, the at least one unified matter is produced after at least one original information obtained from at least one information source is unified by at least one Matterizer.

In an embodiment, the projector is loaded into an engine that provides a compatible environment to execute the projector.

In an embodiment, the projectable space instance is an object, an extensible markup language document, or an instance which is instantiated with a structured language or a structured protocol.

In accordance with another aspect of the present invention, there is provided a property management system for providing a projectable space instance to a machine. The projectable space instance is used for modeling a home system. When the projectable space instance is acquired by the machine, a projector parses the projectable space instance. After the projectable space instance is parsed, a projected home system corresponding to the home system is created, so that at least one property is accessible by a user.

In an embodiment, the projectable space instance is acquired by the machine through a uniform resource identifier (URI) and/or a login process of the user.

In an embodiment, the projectable space instance contains plural unified matters for modeling the home system.

In an embodiment, at least a portion of the plural unified matters constitutes a cloud desktop, a workspace creator, a service manager and/or a relationship manager.

In an embodiment, the user accesses the at least one property through the cloud desktop. Alternatively, a deliverable workspace is created by the user through the workspace creator. Alternatively, the service manager includes at least one Matterizer, wherein at least one unified tool and/or at least one unified information unit is imported into the home system and/or the at least one property through the at least one Matterizer. Alternatively, an interpersonal relationship is managed, aggregated or accessed by the user through the relationship manager.

In an embodiment, the at least one property includes a deliverable workspace that is modelled by an additional projectable space instance, and at least one unified matter is allowed to be added to or removed from the additional projectable space instance.

In an embodiment, the at least one unified matter is produced after at least one original information obtained from at least one information source is unified by at least one Matterizer.

In an embodiment, the projectable space instance is an object, an extensible markup language document, or an instance which is instantiated with a structured language or a structured protocol.

In accordance with another aspect of the present invention, there is provided a property management method. Firstly, a projectable space instance for modeling a home system is acquired. Then, a projector parses the projectable space instance. After the projectable space instance is parsed, a projected home system corresponding to the home system is created, so that at least one property is accessible.

In an embodiment, the projectable space instance is acquired by the machine through a uniform resource identifier (URI) and/or a login process of the user; and/or the projectable space instance is an object, an extensible markup language document, or an instance which is instantiated with a structured language or a structured protocol; and/or the projector is loaded into an engine that provides a compatible environment to execute the projector.

In an embodiment, the projectable space instance contains plural unified matters for modeling the home system.

In an embodiment, at least a portion of the plural unified matters constitutes a cloud desktop, a workspace creator, a service manager and/or a relationship manager.

In an embodiment, a user accesses the at least one property through the cloud desktop.

In an embodiment, a deliverable workspace is created by a user through the workspace creator.

In an embodiment, the service manager includes at least one Matterizer, wherein at least one unified tool and/or at least one unified information unit is imported into the home system and/or the at least one property through the at least one Matterizer.

In an embodiment, at least one original tool corresponding to the at least one unified tool includes a utility, a widget, an agent, an application, a service or any executable element accessible from a corresponding machine or a server; and/or at least one original information corresponding to the at least one unified information unit includes a file, a web page, a database row, a policy, a rule, a policy or any information accessible from a corresponding machine or a server.

In an embodiment, an interpersonal relationship is managed, aggregated or accessed by a user through the relationship manager.

In an embodiment, the at least one property includes a deliverable workspace that is modelled by an additional projectable space instance, and at least one unified matter is allowed to be added to or removed from the additional projectable space instance.

In an embodiment, the at least one unified matter is produced after at least one original information obtained from at least one information source is unified by at least one Matterizer.

In accordance with another aspect of the present invention, there is provided a machined. A projector is loaded into the machine, and a projectable space instance for modeling a home system is acquired by the machine. After the projectable space instance is acquired by the projector and the projectable space instance is parsed, a projected home system corresponding to the home system is created, so that at least one property is accessible by a user.

In an embodiment, the projectable space instance is acquired by the machine through a uniform resource identifier (URI) and/or a login process of the user; and/or the projectable space instance is an object, an extensible markup language document, or an instance which is instantiated with a structured language or a structured protocol; and/or the projector is loaded into an engine that provides a compatible environment to execute the projector.

In an embodiment, the projectable space instance contains plural unified matters for modeling the home system.

In an embodiment, at least a portion of the plural unified matters constitutes a cloud desktop, a workspace creator, a service manager and/or a relationship manager.

In an embodiment, the user accesses the at least one property through the cloud desktop. Alternatively, a deliverable workspace is created by the user through the workspace creator. Alternatively, the service manager includes at least one Matterizer, wherein at least one unified tool and/or at least one unified information unit is imported into the home system and/or the at least one property through the at least one Matterizer. Alternatively, an interpersonal relationship is managed, aggregated or accessed by the user through the relationship manager.

In an embodiment, the at least one property includes a deliverable workspace that is modelled by an additional projectable space instance, and at least one unified matter is allowed to be added to or removed from the additional projectable space instance.

In an embodiment, the at least one unified matter is produced after at least one original information obtained from at least one information source is unified by at least one Matterizer.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 9A and 9B schematically illustrating the relationship between a projectable space instance and a projected home system as shown in FIG. 8;

DETAILED DESCRIPTION

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a web page, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
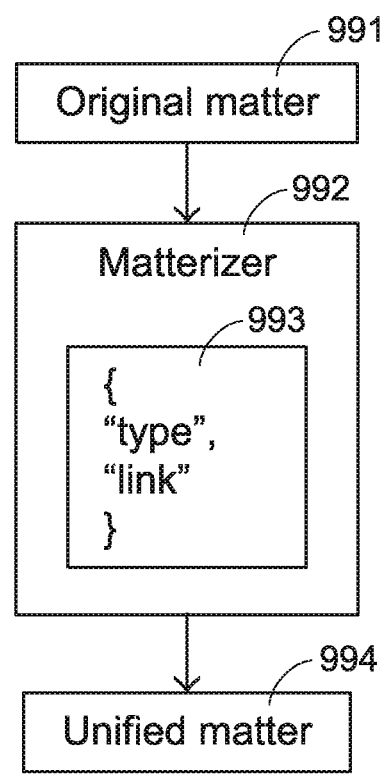
FIG. 1 is a schematic diagram illustrating an implementation concept of a unifying method according to an embodiment.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attribute of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, the type of the unified tool is used for defining a component type. The component type of the unified tool and the link where the unified tool is located are used to obtain a physical component essential to the unified tool for proceeding with plugging in, managing or executing. Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modelled into a unified application program (i.e., the unified tool) compatible with the Android system so as to be executed in the Android system.

Figure 10:
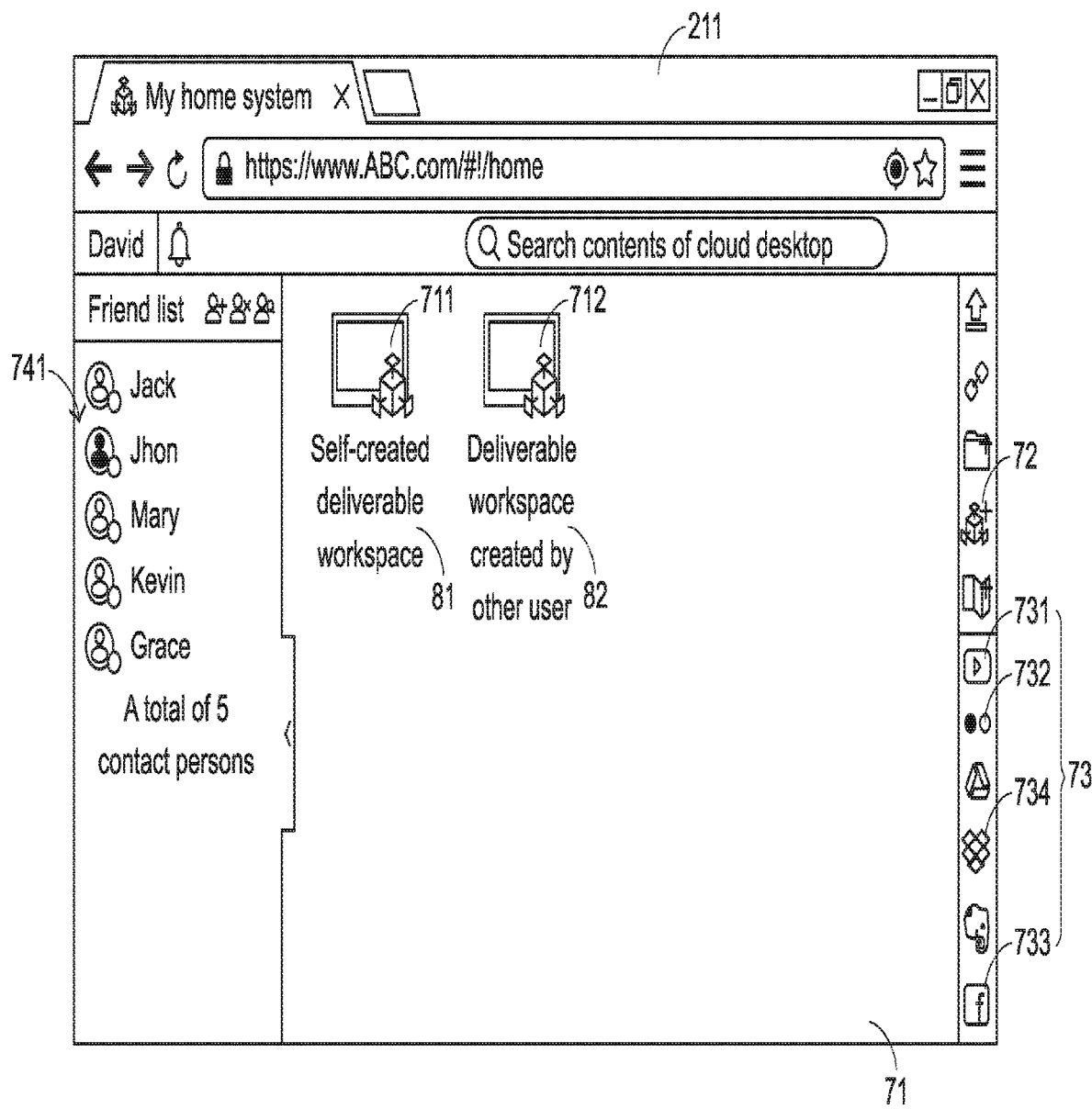
FIG. 10 is a schematic diagram illustrating the operating concept of the cloud desktop as shown in FIG. 9B.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2, the Dropbox importer 9761' of FIG. 6 and the YouTube importer 731, the Flicker importer 732, the Facebook importer 733 and the Dropbox importer 734 of FIG. 10 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the above at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 2:
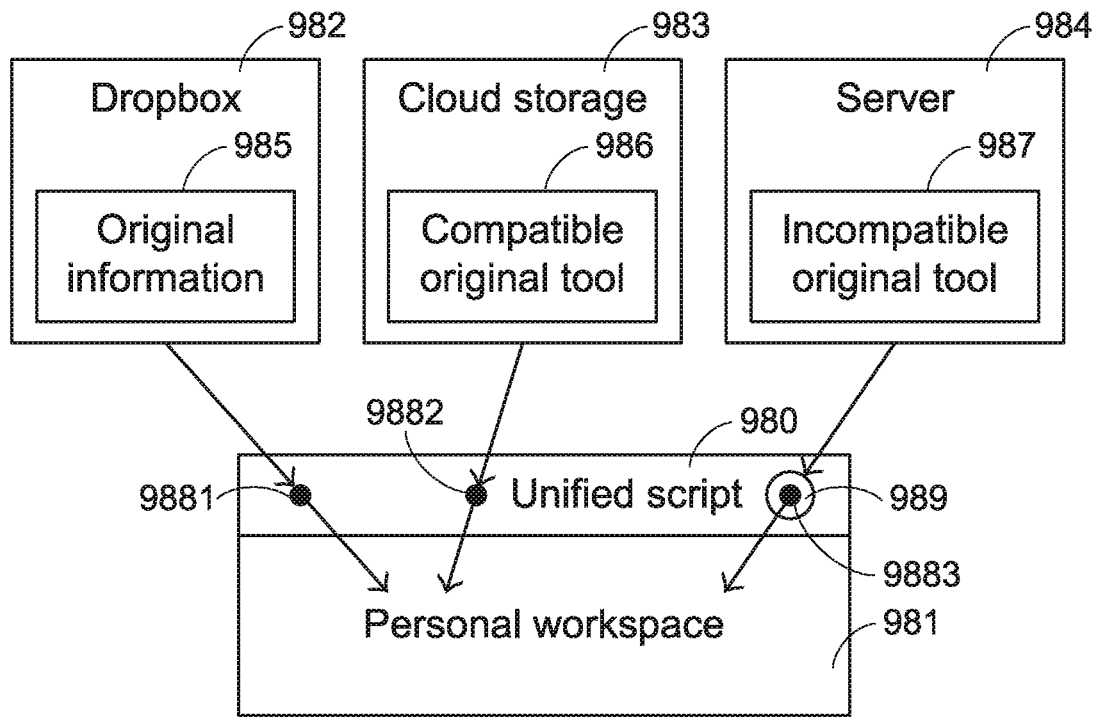
FIG. 2 is a schematic diagram illustrating an implementation concept of using the unified script as an intermediate language for implementing the personal workspace.
Figure 3:
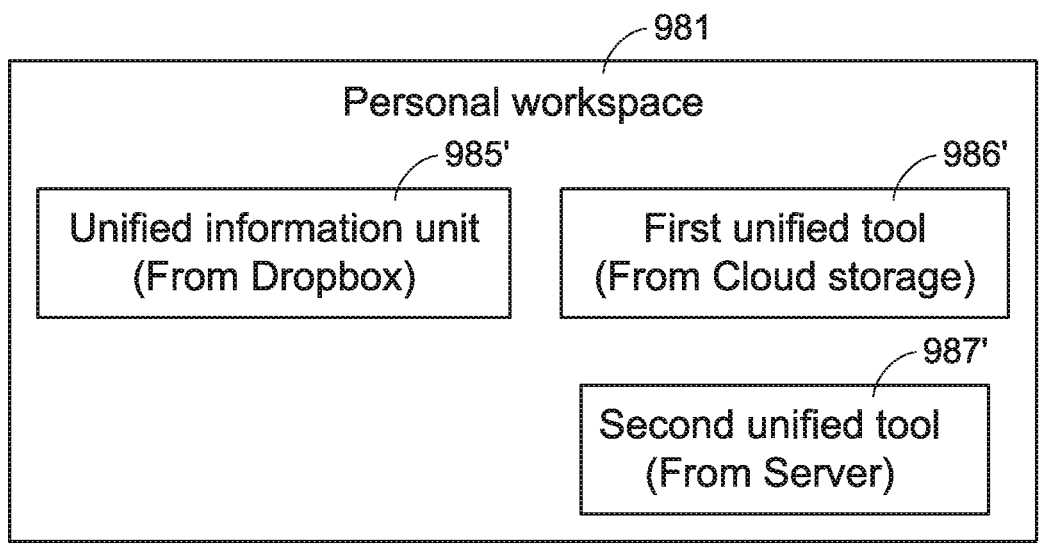
FIG. 3 is a schematic diagram illustrating a preferred configuration of a personal workspace.

Please refer to FIG. 2 and FIG. 3. FIG. 2 is a schematic diagram illustrating an implementation concept of using the unified script as an intermediate language for implementing the workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 which is regarded as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410796528.4, entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted.

For example, the unified script as the intermediate language for implementing the workspace can be previously edited. Consequently, the workspace has the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. An example of the electronic device includes but is not limited to a mobile phone, a tablet computer, a notebook computer or a desktop computer. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded into an engine for providing a compatible environment to execute the projector. An example of the engine includes but is not limited to a Javascript engine, a Windows application or a Linux application. Preferably but not exclusively, the united script can be declared by a document type definition (DTD), an extensible markup language (XML) Schema, a structured language or a structured protocol. Preferably but not exclusively, the projectable space instance is an object, an extensible markup language (XML) document, or an instance instantiated with a structured language or a structured protocol.

Figure 4:
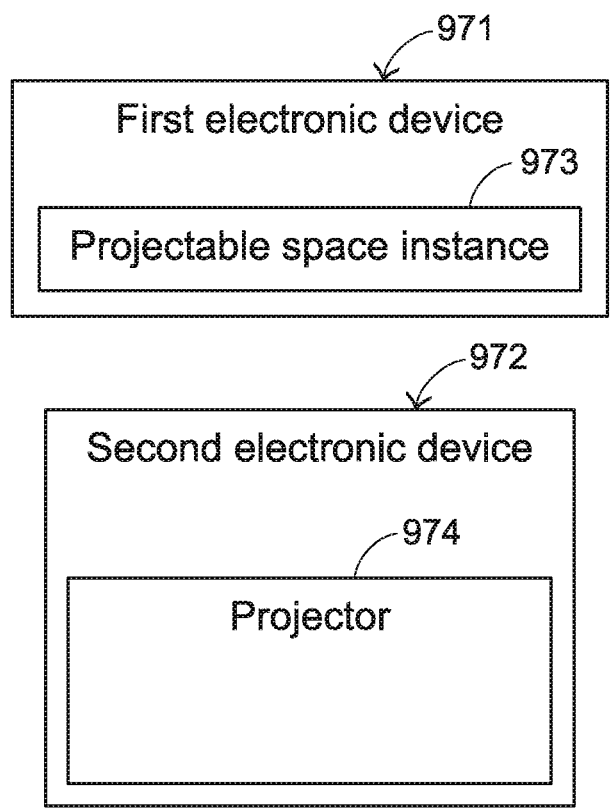
FIG. 4 is a schematic diagram illustrating an initial state of the method of projecting the workspace according to an embodiment of the present invention.
Figure 5A:
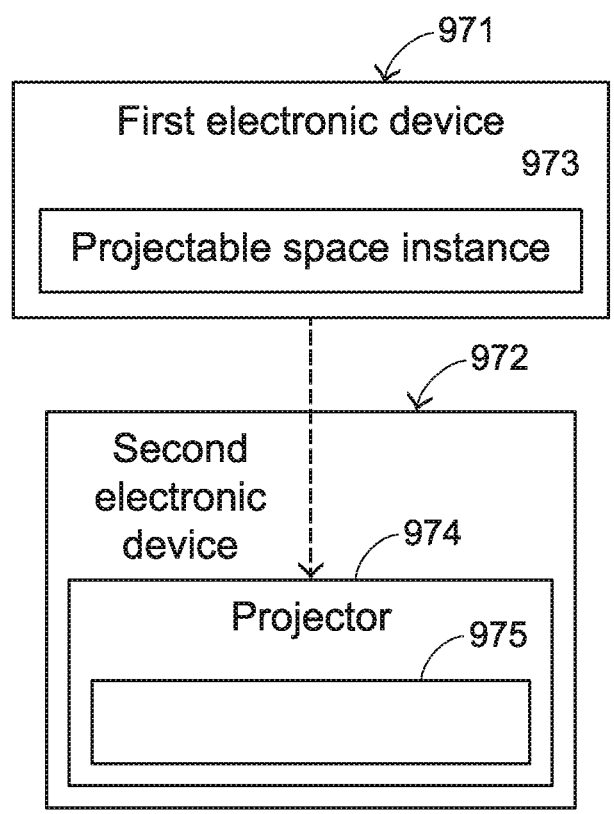
FIGS. 5A and 5B are schematic diagrams illustrating operating concepts of the method of projecting the workspace as shown in FIG. 4.
Figure 5B:
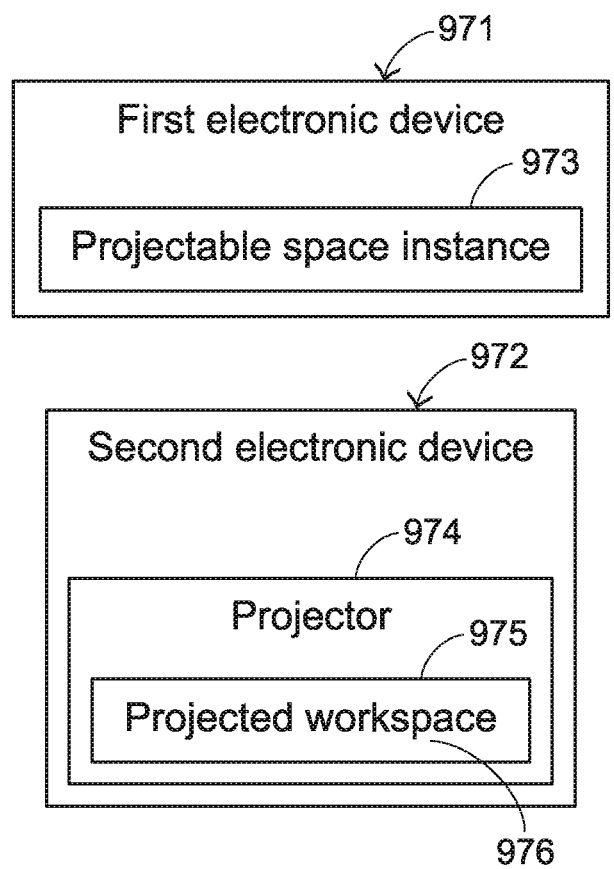
Figure 6:
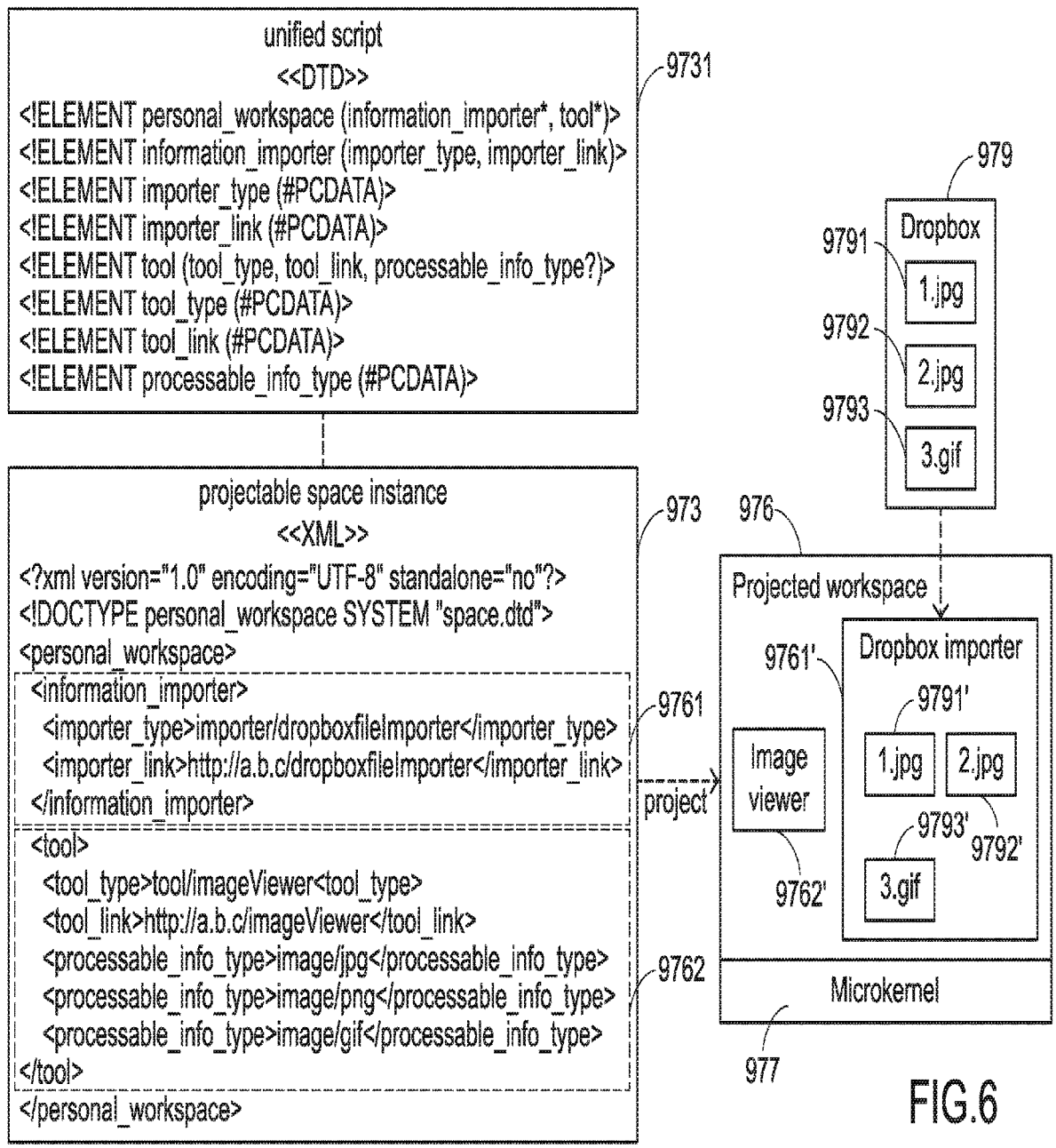
FIG. 6 is a schematic diagram illustrating the relationship between a projectable space instance as shown in FIG. 4 and a projected workspace as shown in FIG. 5B.

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the united script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units includes a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/577,772, entitled "Method of projecting a workspace and system using the same", and also referred to the China Patent Application No. 201410814138.5, entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention. Moreover, any workspace can be projected to any electronic device with computational capability. That is, any workspace can be delivered to any electronic device with computational capability. Consequently, the workspace is also a working platform for allowing multiple cooperators to implement the cooperative task.

Herein, "the descriptions of implementing the cooperative task through the workspace" may be referred to the China Patent Application No. 201510003717.6, entitled "Networking cooperation method and machine using such method", and also referred to the PCT Patent No. PCT/CN2015/083179, which claims the benefit of priority to the China Patent Application No. 201510003717.6 and is entitled "Networking cooperation method and machine using such method". The detailed descriptions thereof are omitted.

As the internet is progressively expanded, the applications and products of the internet are increased. Such as, the number of workspaces created according to the practical requirements increases. For example, the workspace can be created by a specified user, or the workspaces created by other user can be projected to the workspace of the machine of the specified user through URI. For operating the workspaces again, the user has to pay much attention to maintenance and management of the workspaces and memorize or store the URI corresponding to the projectable space instance of each workspace. In other words, the conventional technology is not user-friendly. Therefore, the present invention provides a property management method for solving the drawbacks of the conventional technology.

For well describing the property management method, the term "workspaces" and the corresponding "projected workspaces" are hereinafter referred to as "deliverable workspaces".

Figure 7:
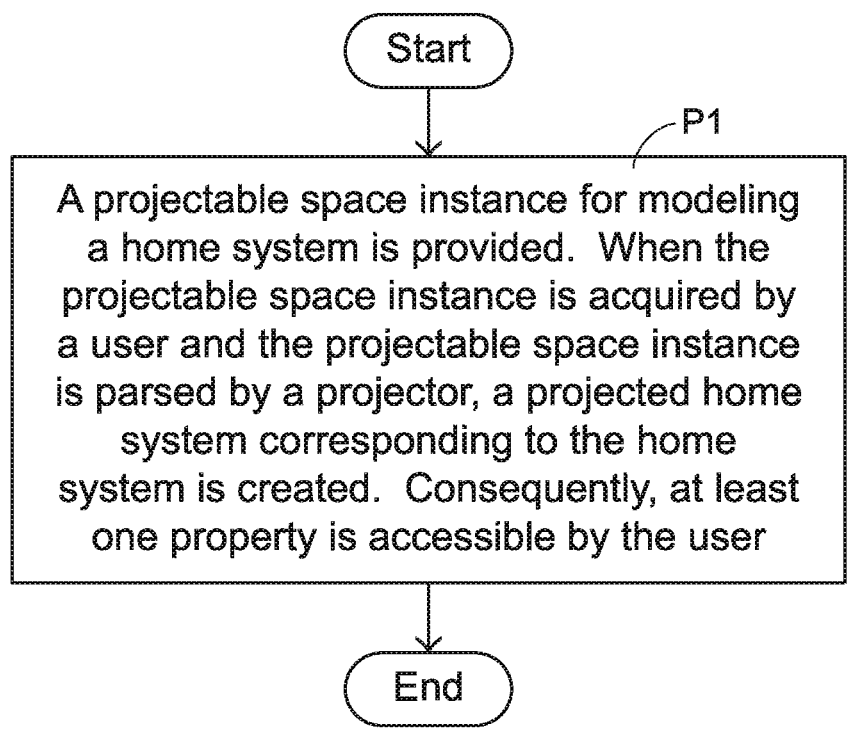
FIG. 7 is a flowchart illustrating a property management method according to an embodiment of the present invention.

FIG. 7 is a flowchart illustrating a property management method according to an embodiment of the present invention. The property management method includes a step of providing a projectable space instance for modeling a home system. When the projectable space instance is acquired by a user and the projectable space instance is parsed by a projector, a projected home system corresponding to the home system is created. Consequently, at least one property is accessible by the user. Hereinafter, the property management method of FIG. 7 will be further illustrated with reference to FIGS. 8~10.

Figure 8:
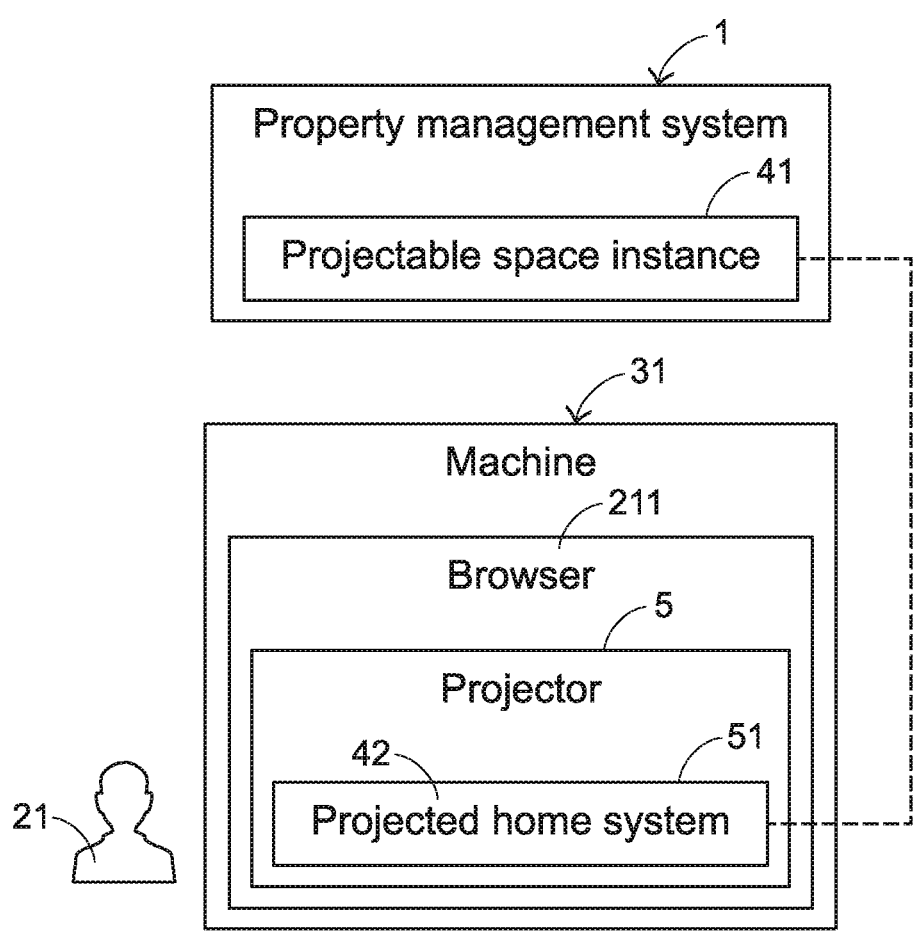
FIG. 8 is a schematic diagram illustrating a property management system and a machine using the property management method of FIG. 7.
Figure 9B:
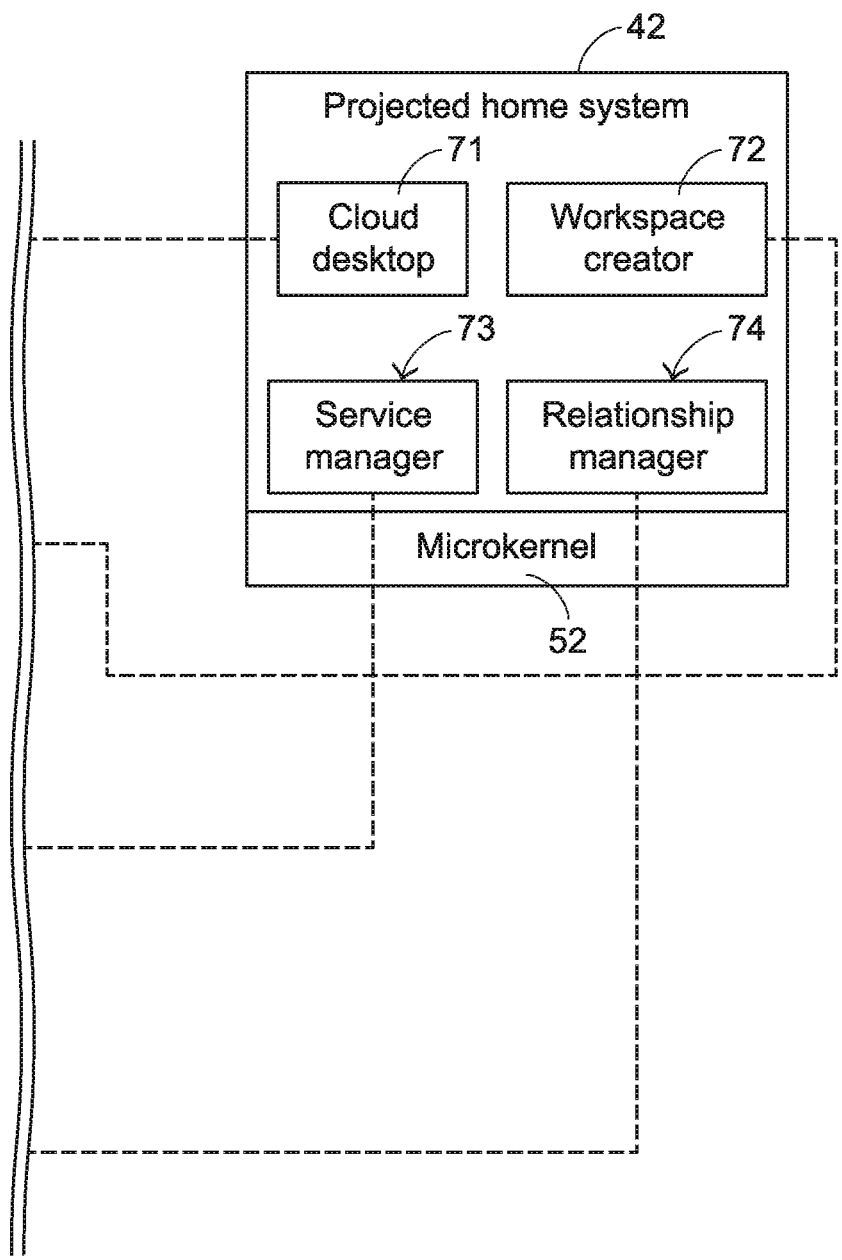

Please refer to FIGS. 8, 9A and 9B. FIG. 8 is a schematic diagram illustrating a property management system and a machine using the property management method of FIG. 7. FIGS. 9A and 9B schematically illustrating the relationship between a projectable space instance and a projected home system as shown in FIG. 8. It is noted that the home system is also an example of the "workspace". After the home system is projected to a machine 31 of a user 21, the property of the projected home system is accessible by the user 21. Moreover, the projectable space instance 41 for modeling the home system contains plural unified matters 6, and the projectable space instance 41 is included in the property management system 1.

In particular, the user 21 can access his/her property by activating the home system. For example, the projectable space instance 41 in the property management system 1 is loaded into the machine 31 of the user 21. Consequently, a projector 5 in the machine 31 will build a working environment 51 in the machine 31 for executing the projected home system 42. In addition, a microkernel 52 corresponding to the projected home system 42 is provided from the projector 5 to the working environment 51 for equipping the unified matter 6 of the projectable space instance 41. After the projectable space instance 41 is loaded into the machine 31, the projector 5 starts to parse the projectable space instance 41. After the projectable space instance 41 is parsed by the projector 5, the projected home system 42 is built in the working environment 51 of the machine 31 according to parsed contents of the projectable space instance 41. Consequently, the home system is activated. An example of the machine 31 of the user 21 includes but is not limited to a computer (e.g., a desktop computer, a notebook computer or a tablet computer), a portable electronic device (e.g., a smart phone, a personal digital assistant, a wearable device or any other internet accessible device.

After the user 21 opens a browser 211 of the machine 31 and inputs a uniform resource identifier (URI) of the projectable space instance 41, the projectable space instance 41 is loaded into the machine 31. In another embodiment, after the user 21 opens the browser 211 of the machine 31 and logins into the property management system 1, the projectable space instance 41 or the URI of the projectable space instance 41 is acquired. The way of loading the projectable space instance 41 into the machine 31 is presented herein for purpose of illustration and description only. It is noted that numerous modifications and alterations may be made while retaining the teachings of the invention.

Figure 11:
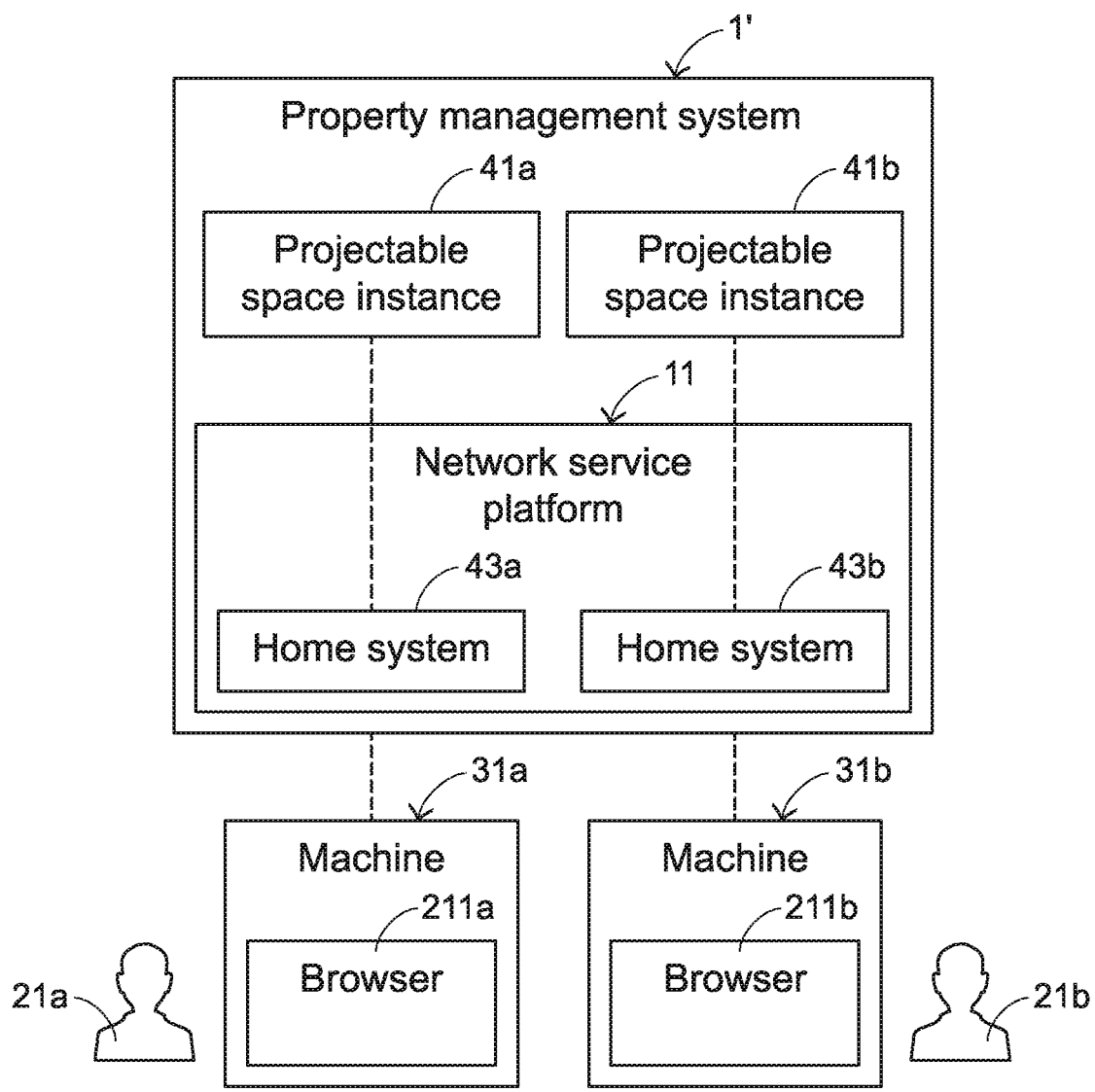
FIG. 11 is a schematic diagram illustrating the use of the property management system of the present invention as a device for hosting the network service platform.

In this embodiment, the projectable space instance 41 is an instance instantiated with the extensible markup language (XML). FIGS. 9A and 9B also show the compiled contents of the projectable space instance 41 and the relationships between the compiled contents of the projectable space instance 41 and the projected home system 42. In FIG. 11, the both ends of each dotted line denote the compiled contents of the projectable space instance 41 and the corresponding unified matter 6 in the relationship. For example, a first portion 61 of the unified matters 6 corresponds to a cloud desktop 71, a second portion of the unified matters 6 corresponds to a workspace creator 72, a third portion of the unified matters 6 corresponds to a service manager 73, and a fourth portion of the unified matters 6 corresponds to a relationship manager 74. The operations of the cloud desktop 71, the workspace creator 72, the service manager 73 and the relationship manager 74 will be described in FIG. 10. It is noted that the examples of the unified matters 6 in the projectable space instance 41 are not restricted. Those skilled in the art will readily observe that the desired unified matters 6 can be configured in the projectable space instance 41 according to the practical requirements.

In this embodiment, the deliverable workspaces that are created by the user 21 and the deliverable workspaces that are created by other users and received by the user 21 through the corresponding URI are considered as the "properties" of the user 21. Consequently, the user 21 can manage these deliverable workspaces through the projected home system 42 that is created in the machine 31 of the user 21. It is noted that the property accessed through activation of the home system is not restricted to the deliverable workspace. Those skilled in the art will readily observe that numerous modifications and alterations may be made while retaining the teachings of the invention.

FIG. 10 is a schematic diagram illustrating the operating concept of the cloud desktop as shown in FIG. 9B. After the projected home system 42 is created in the machine 31, the projected home system 42 is embodied by displaying the cloud desktop 71 on the browser 211. That is, the cloud desktop 71 is used as an operating interface for the user 21. The cloud desktop 71, the workspace creator 72, the service manager 73 and the relationship manager 74 are shown on the cloud desktop 71 so as to be operated by the user 21. The user 21 can create a deliverable workspace 81 through the workspace creator 72. After the tools and/or information are unified into unified tools and/or unified information units, the user 21 can add the unified tools and/or the unified information units to the cloud desktop 71 or the deliverable workspaces 81 and 82 that are managed by the home system through the service manager 73. Moreover, an interpersonal relationship is managed, aggregated or accessed by the user 21 through the relationship manager 74.

In this embodiment, the deliverable workspace 81 is created by the user 21, and the deliverable workspace 82 is created by other users and received by the user 21 through the corresponding URI. The deliverable workspaces 81 and 82 are both stored in the cloud desktop 71. Moreover, the deliverable workspaces 81 and 82 stored in the cloud desktop 71 are indicated by icons 711 and 712, respectively. Subsequently, in response to a specified action (e.g., a clicking action) on the icon 711 or 712, the user 21 can access and operate the corresponding deliverable workspace 81 or 82. That is, after the deliverable workspace 82 is stored in the cloud desktop 71, the user 21 can access and operate the deliverable workspace 82 with the need of searching the URI corresponding to the deliverable workspace 82.

In this embodiment, the service manager 73 shown on the cloud desktop 71 includes a YouTube importer 731, a Flicker importer 732, a Facebook importer 733 and a Dropbox importer 734. According to the practical requirements, the user 21 can add the video/audio data of the YouTube network service platform to the cloud desktop 71 or any of the deliverable workspaces 81 and 82 through the YouTube importer 731. Moreover, the user 21 can add the image data of the Flicker network service platform to the cloud desktop 71 or any of the deliverable workspaces 81 and 82 through the Flicker importer 732. Moreover, the user 21 can add the information of the Facebook network service platform to the cloud desktop 71 or any of the deliverable workspaces 81 and 82 through the Facebook importer 733. Moreover, the user 21 can add the data of the Dropbox network service platform to the cloud desktop 71 or any of the deliverable workspaces 81 and 82 through the Dropbox importer 734. It is noted that the examples of the Matterizers in the service manager 73 are not restricted. Those people skilled in the art will readily observe that the desired Matterizers can be configured in the projectable space instance 41 according to the practical requirements.

In this embodiment, the relationship manager 74 shown on the cloud desktop 71 contains a friend list 741. The user 21 can invite other users to be friends in the friend list 741. Moreover, the user 21 can add any member in any of the deliverable workspaces 81 and 82 to the friend list 741. Consequently, the user 21 can manage, aggregate or access his/her interpersonal relationship. Preferably but not exclusively, the projected home system 42 also allows the user 21 to perform text communication, audio communication or video communication with the friends in the friend list 741. It is noted that the examples of the relationship manager 74 are not restricted. That is, the examples of the relationship manager 74 may be altered according to the practical requirements.

Moreover, the property management system is a personal device to be user by a personal user, or the property management system is network service device for hosting a network service platform. For example, the network service device is a commercial device, a community-owned device or a non-profit device. FIG. 11 is a schematic diagram illustrating the use of the property management system of the present invention as a device for hosting the network service platform. As shown in FIG. 11, the users 21*a* and 21*b* can access the network service platform 11 that is hosted by the property management system 1' through the browsers 211*a* and 211*b*, respectively. Moreover, after the users 21*a* and 21*b* register or apply user accounts to login into the network service platform 11, the users 21*a* and 21*b* can create their own home systems 43*a* and 43*b* in order to manage their own properties. The projectable space instance 41*a* for modeling the home system 43*a* and the projectable space instance 41*b* for modeling the home system 43*b* are included in the property management system 1'. In addition, the data of the user accounts that are registered or applied by the users 21*a* and 21*b* are recorded into the property management system 1'. The methods of allowing the users 21*a* and 21*b* to access their properties after their own home systems 43*a* and 43*b* are created are similar to those mentioned above, and are not redundantly described herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for managing unified matters in a workspace, comprising:

creating a workspace in a machine, wherein the workspace is configured with a plurality of unified matters, the plurality of unified matters are produced after a plurality of original matters located in different information sources being unified by at least one matterizer, wherein at least a portion of the plurality of unified matters are arranged in a specific area of the workspace, the plurality of unified matters including at least one unified tool obtained by modeling at least one original tool; and displaying an operating interface of the workspace on the machine, the at least one unified tool is implemented in response to an interaction using the operating interface, wherein the interaction is between a user and at least one information unit added in the workspace.

2. The method according to claim 1, wherein the workspace is modelled by a projectable space instance, and the projectable space instance is parsed by a projector for building the workspace, wherein the projector builds the workspace in the machine according to the projectable space instance.

3. The method according to claim 2, wherein the projectable space instance is acquired by the machine through a uniform resource identifier (URI) and/or a login process of the user; or the projector is loaded into an engine that provides a compatible environment to execute the projector; or the projectable space instance is an object, an extensible markup language document, or an instance which is instantiated with a structured language or a structured protocol; or the plurality of unified matters are allowed to be added to or removed from an additional projectable space instance, wherein a deliverable workspace is modelled by the additional projectable space instance.

4. The method according to claim 1, wherein the specific area of the workspace includes an interface of a workspace creator, an interface of a service manager, an interface of a relationship manager, and/or an interface of a desktop.

5. The method according to claim 1, wherein the plurality of original matters located in different information sources being unified by at least one matterizer comprising:

the matterizer reorganizes an attribute and a link of an original matter with a unified data model, and models the original matter into a unified matter, wherein an attribute of the unified matter includes a type of the original matter and a link indicating where the original matter is located.

6. The method according to claim 1, wherein the at least one information unit is included in the plurality of unified matters.

7. The method according to claim 4, wherein the user operates the workspace creator using the operating interface; and a deliverable workspace is created by the user through the workspace creator; or wherein the unified matter is added to the workspace and/or the deliverable workspace through the at least one matterizer.

8. A machine comprising an electronic device having computational capability and associated storage medium, wherein the electronic device is configured to:

create a workspace in the machine, wherein the workspace is configured with a plurality of unified matters, the plurality of unified matters are produced after a plurality of original matters located in different information sources being unified by at least one matterizer, wherein at least a portion of the plurality of unified matters are arranged in a specific area of the workspace, the plurality of unified matters including at least one unified tool obtained by modeling at least one original tool; and display an operating interface of the workspace on the machine, the at least one unified tool is implemented in response to an interaction using the operating interface, wherein the interaction is between a user and at least one information unit added in the workspace.

9. The machine according to claim 8, wherein the workspace is modelled by a projectable space instance, and the projectable space instance is parsed by a projector in the machine for building the workspace, wherein the projector builds the workspace in the machine according to the projectable space instance.

10. The machine according to claim 9, wherein the projectable space instance is acquired by the machine through a uniform resource identifier (URI) and/or a login process of a user; or the projectable space instance is an object, an extensible markup language document, or an instance which is instantiated with a structured language or a structured protocol; or the projector is loaded into an engine that provides a compatible environment to execute the projector; or the plurality of unified matters are allowed to be added to or removed from an additional projectable space instance, wherein a deliverable workspace is modelled by the additional projectable space instance.

11. The machine according to claim 8, wherein the specific area of the workspace includes an interface of a workspace creator, an interface of a service manager, an interface of a relationship manager, and/or an interface of a desktop.

12. The machine according to claim 8, wherein the plurality of original matters located in different information sources being unified by at least one matterizer comprising:

the matterizer reorganizes an attribute and a link of an original matter with a unified data model, and models the original matter into a unified matter, wherein an attribute of the unified matter includes a type of the original matter and a link indicating where the original matter is located.

13. The machine according to claim 8, wherein the at least one information unit is included in the plurality of unified matters.

14. The machine according to claim 11, wherein the user operates the workspace creator using the operating interface; and a deliverable workspace is created by the user through the workspace creator; or wherein the unified matter is added to the workspace and/or a deliverable workspace through the at least one matterizer.

15. A non-transitory storage medium having program code stored therein that in response to execution by an electronic device, causes a machine to at least:

create a workspace in the machine, wherein the workspace is configured with a plurality of unified matters, the plurality of unified matters are produced after a plurality of original matters located in different information sources being unified by at least one matterizer, wherein at least a portion of the plurality of unified matters are arranged in a specific area of the workspace, the plurality of unified matters including at least one unified tool obtained by modeling at least one original tool; and display an operating interface of the workspace on the machine, the at least one unified tool is implemented in response to an interaction using the operating interface, wherein the interaction is between a user and at least one information unit added in the workspace.

16. The non-transitory storage medium according to claim 15, wherein the workspace is modelled by a projectable space instance, and the projectable space instance is parsed by a projector in the machine for building the workspace, wherein the projector builds the workspace in the machine according to the projectable space instance.

17. The non-transitory storage medium according to claim 16, wherein the projectable space instance is acquired by the machine through a uniform resource identifier (URI) and/or a login process of a user; or the projectable space instance is an object, an extensible markup language document, or an instance which is instantiated with a structured language or a structured protocol; or the projector is loaded into an engine that provides a compatible environment to execute the projector; or the plurality of unified matters are allowed to be added to or removed from an additional projectable space instance, wherein a deliverable workspace is modelled by the additional projectable space instance.

18. The non-transitory storage medium according to claim 15, wherein the specific area of the workspace includes an interface of a workspace creator, an interface of a service manager, an interface of a relationship manager, and/or an interface of a desktop.

19. The non-transitory storage medium according to claim 15, wherein the plurality of original matters located in different information sources being unified by at least one matterizer comprising:

the matterizer reorganizes an attribute and a link of an original matter with a unified data model, and models the original matter into a unified matter, wherein an attribute of the unified matter includes a type of the original matter and a link indicating where the original matter is located.

20. The non-transitory storage medium according to claim 15, wherein the at least one information unit is included in the plurality of unified matters.

21. The non-transitory storage medium according to claim 18, wherein the user operates the workspace creator using the operating interface; and a deliverable workspace is created by the user through the workspace creator; or wherein the unified matter is added to the workspace and/or a deliverable workspace through the at least one matterizer.

* * * * *